US012206289B2

(12) United States Patent
Thiele et al.

(10) Patent No.: US 12,206,289 B2
(45) Date of Patent: Jan. 21, 2025

(54) RADIAL SPOKED ROTOR WITH AXIAL ASSIST MAGNETS

(71) Applicant: REGAL BELOIT AMERICA, INC., Beloit, WI (US)

(72) Inventors: Mark K. Thiele, Cape Woolamai (AU); Greg Heins, Melbourne (AU); Jiang Guo Ping, Changzhou (CN); Anthony Carl Maiorano, Dayton, OH (US)

(73) Assignee: Regal Beloit America, Inc., Milwaukee, WI (US)

( * ) Notice: Subject to any disclaimer, the term of this patent is extended or adjusted under 35 U.S.C. 154(b) by 228 days.

(21) Appl. No.: 17/822,627

(22) Filed: Aug. 26, 2022

(65) Prior Publication Data

US 2024/0072587 A1    Feb. 29, 2024

(51) Int. Cl.
| | |
|---|---|
| *H02K 1/2793* | (2022.01) |
| *H02K 1/14* | (2006.01) |
| *H02K 1/276* | (2022.01) |

(52) U.S. Cl.
CPC .............. *H02K 1/2793* (2013.01); *H02K 1/14* (2013.01); *H02K 1/276* (2013.01)

(58) Field of Classification Search
CPC .......... H02K 7/04; H02K 1/2793; H02K 1/14; H02K 1/276
See application file for complete search history.

(56) References Cited

U.S. PATENT DOCUMENTS

| | | | |
|---|---|---|---|
| 4,933,583 A * | 6/1990 | Ripplinger | ............... H02K 7/04 |
| | | | 310/216.116 |
| 6,924,574 B2 | 8/2005 | Qu et al. | |
| 6,987,342 B2 | 1/2006 | Hans | |
| 7,332,845 B2 | 2/2008 | Heideman et al. | |
| 7,471,026 B2 | 12/2008 | Bender | |
| 7,626,309 B2 * | 12/2009 | Watson | ................ H02K 15/165 |
| | | | 29/598 |
| 8,373,326 B2 | 2/2013 | Enomoto et al. | |

(Continued)

OTHER PUBLICATIONS

Atallah, Kais et al., A Rotor with Axially and Circumferentially Magnetized Permanent Magnets, IEEE Transactions on Magnetics, Nov. 2012, vol. 48, No. 11, pp. 3230-3233.

(Continued)

*Primary Examiner* — Burton S Mullins
(74) *Attorney, Agent, or Firm* — Armstrong Teasdale LLP

(57) ABSTRACT

A rotor assembly is disclosed, including a rotatable rotor shaft defining a central axis, the rotor shaft coupled to a rotor core, the rotor core including a plurality of rotor pole pieces circumferentially located about the central axis, each pair of adjacent pole pieces being separated by a space, said rotor core comprising a plurality of core magnets located in the spaces separating the adjacent pole pieces; at least one magnet retainer plate positioned adjacent the rotor core and connected to the rotatable rotor shaft, the at least one magnet retainer plate including a plurality of circumferentially spaced magnet slots and balancing slots located between adjacent magnet slots, the balancing slots configured to receive a balancing weight; and, compression springs located in the balancing slots, each compression spring located adjacent a respective core magnet when the at least one magnet retainer plate is located adjacent the rotor core.

25 Claims, 9 Drawing Sheets

(56) References Cited

U.S. PATENT DOCUMENTS

| | | |
|---|---|---|
| 8,497,612 B2 | 7/2013 | Minowa et al. |
| 8,624,458 B2 | 1/2014 | Jack et al. |
| 8,680,736 B2 | 3/2014 | Wang et al. |
| 8,710,711 B2 | 4/2014 | Pennander et al. |
| 9,013,082 B2 | 4/2015 | Ge et al. |
| 9,048,712 B2 | 6/2015 | Lee et al. |
| 9,178,394 B2 | 11/2015 | Asahi et al. |
| 9,318,938 B2 | 4/2016 | Carpenter et al. |
| 9,343,934 B2 | 5/2016 | Zhao et al. |
| 9,472,997 B2 | 10/2016 | Figgins et al. |
| 9,502,929 B2 | 11/2016 | Yamada et al. |
| 9,590,459 B2 | 3/2017 | Hoemann |
| 10,069,357 B2 | 9/2018 | Ekin et al. |
| 10,122,223 B2 | 11/2018 | Takezaki et al. |
| 10,263,480 B2 | 4/2019 | Hunstable |
| 10,291,086 B2 | 5/2019 | Deak et al. |
| 10,742,083 B2 | 8/2020 | Hunter et al. |
| 10,763,711 B2 | 9/2020 | Han et al. |
| 10,794,780 B2 | 10/2020 | Paul et al. |
| 11,133,734 B2 | 9/2021 | Sandner et al. |
| 11,309,778 B2 | 4/2022 | Hunstable |
| 2010/0295389 A1 | 11/2010 | Tessier et al. |
| 2016/0006303 A1 | 1/2016 | Hoemann et al. |
| 2017/0366050 A1 | 12/2017 | Hattori et al. |
| 2019/0103791 A1 | 4/2019 | Goel et al. |
| 2019/0165659 A1* | 5/2019 | Hattori .................. H02K 1/276 |
| 2020/0295610 A1 | 9/2020 | To et al. |
| 2022/0115936 A1 | 4/2022 | Hunstable |
| 2022/0123607 A1 | 4/2022 | Zhou et al. |

OTHER PUBLICATIONS

Liu, Xiping et al., Comparative Design and Analysis of a New Type of Mechanical-Variable-Flux Flux-Intensifying Interior Permanent Magnet Motor, Progress in Electromagnetics Research C, 2021, vol. 111, 225-239.

* cited by examiner

RADIAL SPOKED ROTOR WITH AXIAL ASSIST MAGNETS

BACKGROUND

The field of the disclosure relates generally to variable torque constant electric motors and generators, and more particularly, to radially embedded permanent magnet rotors with rotor balancing features.

Radial flux electric machines generally include spoked permanent magnets positioned within a rotor core, commonly referred to as an interior permanent magnet rotor. The rotor is formed from multiple laminations. The laminations define circumferentially spaced poles. Alternatively, the poles may comprise discrete members supported by the rotor. Slots are formed between adjacent poles, and spoke magnets are inserted into the slots. To further increase the efficiency of the motor, and prevent flux from leaking across laminations, the rotor can include axial magnets positioned above and below the spoke magnets.

Circumferential movement of spoked magnets at lower rotor speeds creates an audible noise due to the changing reluctance of the stator and contact between the moved spoked magnets and lamination slots as a result of minimal clearances therebetween. Furthermore, improper balancing of the rotor assembly can lead to vibration and noise generation. Finally, clamping of the axial magnets can cause brittle magnets to crack during rotor assembly.

Thus, there is a need in the field for improved rotor assembly balancing techniques, methods and features, as well as improvements that will yield a reduction of audible noise produced by the motor due to reluctance of the stator and small clearances between the spoked magnets and lamination slots.

BRIEF DESCRIPTION

In one embodiment, a rotor assembly for use in a radial flux electric motor assembly is disclosed. The rotor assembly includes a rotatable rotor shaft defining a central axis, the rotor shaft coupled to a rotor core, the rotor core including a plurality of rotor pole pieces circumferentially located about the central axis, each pair of adjacent pole pieces being separated by a space, said rotor core comprising a plurality of core magnets located in the spaces separating the adjacent pole pieces; at least one magnet retainer plate positioned adjacent the rotor core and connected to the rotatable rotor shaft, the at least one magnet retainer plate including a plurality of circumferentially spaced magnet slots and balancing slots located between adjacent magnet slots, the balancing slots configured to receive a balancing weight; and, compression springs located in the balancing slots, each compression spring located adjacent a respective core magnet when the at least one magnet retainer plate is located adjacent the rotor core.

In another embodiment, a rotor assembly for use in a radial flux electric motor assembly. The rotor assembly includes a rotatable rotor shaft defining a central axis, the rotor shaft coupled to a rotor core, the rotor core including a plurality of rotor poles circumferentially located about the central axis, each pair of adjacent pole pieces being separated by a space, said rotor core comprising a plurality of core magnets located in the space separating the adjacent pole pieces; at least one magnet retainer plate positioned adjacent the rotor core and connected to the rotatable rotor shaft, the at least one magnet retainer plate including circumferentially spaced magnet slots and balancing slots located between adjacent magnet slots, the balancing slots configured to receive a balancing weight; and, should the rotor require balancing, at least one balancing weight positioned within the balancing slots.

In yet another embodiment, a rotor assembly for use in a radial flux electric motor assembly. The rotor assembly includes a rotatable rotor shaft defining a central axis, the rotor shaft coupled to a rotor core, the rotor core including a plurality of rotor poles circumferentially located about the central axis, each pair of adjacent pole pieces being separated by a space, said rotor core comprising a plurality of core magnets located in the space separating the adjacent pole pieces; at least one magnet retainer plate positioned adjacent the rotor core and connected to the rotatable rotor shaft, the at least one magnet retainer plate including circumferentially spaced magnet slots and balancing slots located between adjacent magnet slots, the balancing slots configured to receive a balancing weight; compression springs located in the balancing slots; each compression spring located adjacent a respective core magnet when the retainer plate is located adjacent the rotor core and, at least one balancing weight positioned within the balancing slots.

DETAILED DESCRIPTION

A rotor assembly for use in a radial flux electric motor assembly is disclosed. The rotor assembly includes a rotatable rotor shaft defining a central axis, the rotor shaft coupled to a rotor core, the rotor core including a plurality of rotor pole pieces circumferentially located about the central axis, each pair of adjacent pole pieces being separated by a space, said rotor core comprising a plurality of core magnets located in the spaces separating the adjacent pole pieces; at least one magnet retainer plate positioned adjacent the rotor core and connected to the rotatable rotor shaft, the at least one magnet retainer plate including a plurality of circumferentially spaced magnet slots and balancing slots located between adjacent magnet slots, the balancing slots configured to receive a balancing weight; and, compression springs located in the balancing slots, each compression spring located adjacent a respective core magnet when the at least one magnet retainer plate is located adjacent the rotor core. The compression springs comprise a cantilevered arm extending from a first inside surface of the at least one magnet retainer plate, the first inside surface defined by the balancing slot. At least one balancing weight is positioned within one or more of the balancing slots. The balancing weight can be a putty or a weighted element made from a metal or other suitable material.

Figure 1:
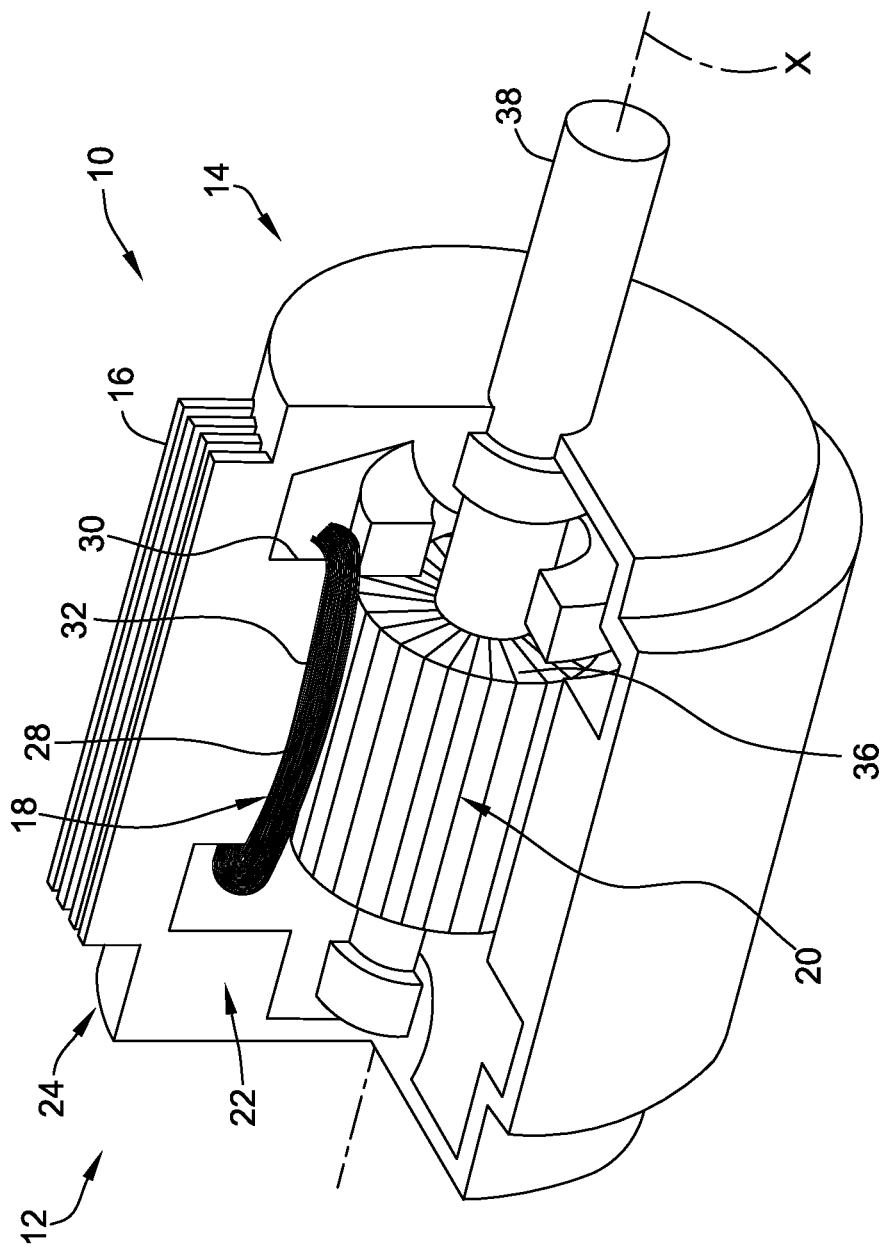
FIG. 1 is a perspective cut-away view of an exemplary electric motor assembly.

FIG. 1 is a perspective cut-away view of an exemplary electric motor 10. Although referred to herein as electric motor 10, electric motor 10 can be operated as either a generator or a motor. Electric motor 10 includes a first end 12, a second end 14, and a motor assembly housing 16. Electric motor 10 also includes a stator assembly 18 and a rotor assembly 20. Motor assembly housing 16 defines an interior 22 and an exterior 24 of motor 10 and is configured to at least partially enclose and protect stator assembly 18 and rotor assembly 20. Stator assembly 18 includes a stator core 28, which includes a plurality of teeth 30 and a plurality of windings 32 wound around stator teeth 30. Furthermore, in an exemplary embodiment, stator assembly 18 is a three-phase salient pole stator assembly and stator core 28 is formed from a stack of laminations made of highly magnetically permeable material. Alternatively, stator assembly 18 is a single-phase salient pole stator assembly. Stator assembly 18 may be a substantially round, segmented, or roll-up type stator construction and windings 32 are wound on stator core 28 in any suitable manner that enables motor 10 to function as described herein. For example, windings 32 may be concentrated type or overlapped type windings.

Rotor assembly 20 includes a permanent magnet rotor core 36 and a shaft 38. In the exemplary embodiment, rotor core 36 is formed from a stack of laminations made of magnetically permeable material. Rotor core 36 is substantially received in a central bore of stator core 28 for rotation about axis of rotation X. Rotor core 36 and stator core 28 are generally disclosed in FIG. 1. However, it should be understood that the rotor and stator cores include the operational characteristics and features required to enable the operation of motor 10. While FIG. 1 is an illustration of a three-phase electric motor, the methods and apparatus described herein may be included within motors having any number of phases, including single phase and multiple phase electric motors.

In the exemplary embodiment, electric motor 10 is coupled to a fan or centrifugal blower (not shown) for moving air through an air handling system, for blowing air over cooling or heating coils, and/or for driving a compressor within an air conditioning/refrigeration system. More specifically, motor 10 may be used in air moving applications used in the heating, ventilation, and air conditioning (HVAC) industry, for example, in residential applications using ⅕ horsepower (hp) to 1 hp motors. Alternatively, motor 10 may be used in fluid pumping applications. Motor 10 may also be used in commercial and industrial applications and/or hermetic compressor motors used in air conditioning applications, where motor 10 may have a rating of greater than 1 hp. Although described herein in the context of an air handling system, electric motor 10 may engage any suitable work component and be configured to drive such a work component.

Figure 2:
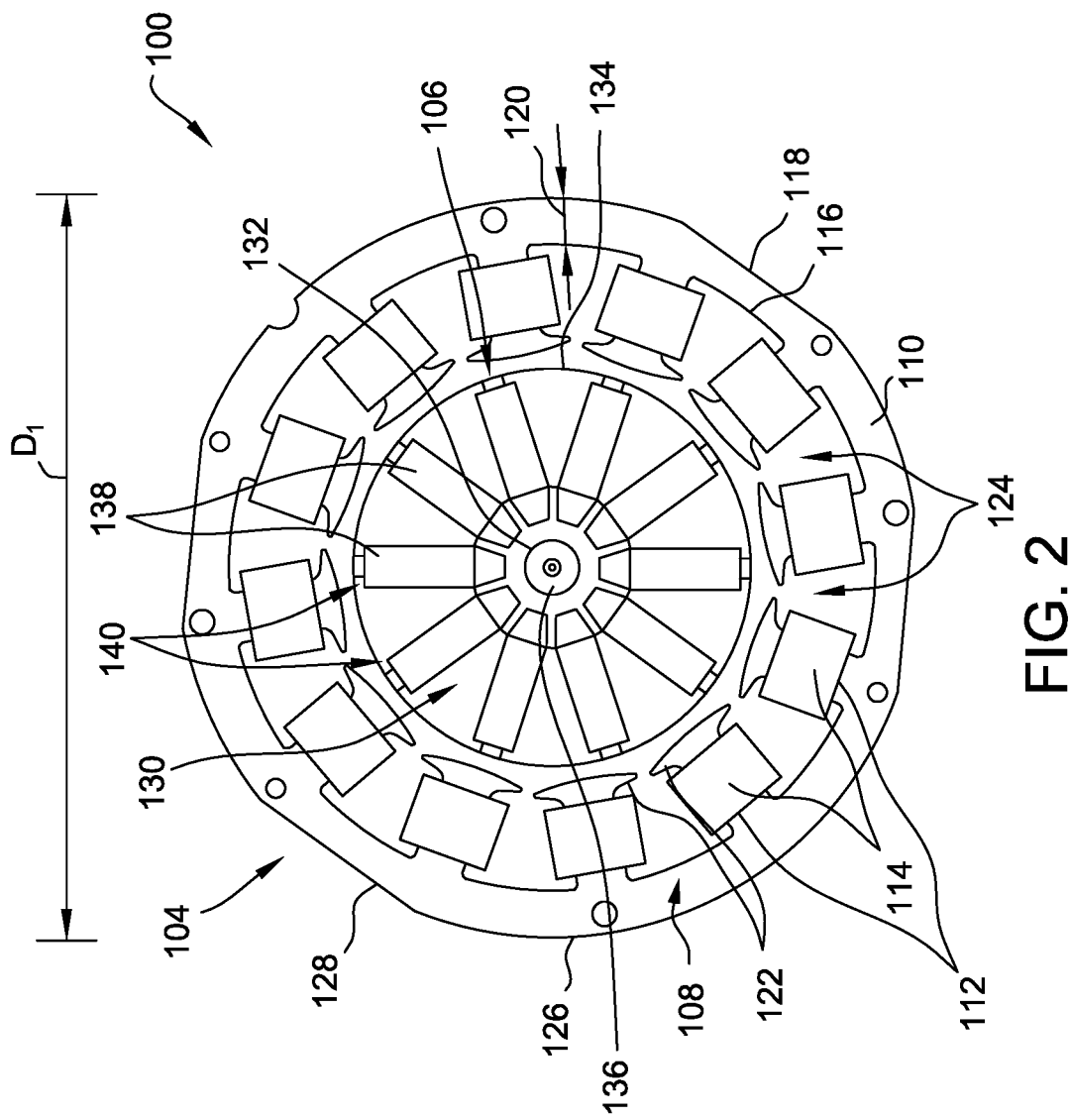
FIG. 2 is an end view of a stator assembly and a rotor assembly of the electric motor assembly shown in FIG. 1.

FIG. 2 is a cross-sectional end view of an exemplary electric motor assembly 100 having a central axis X and that includes a stator assembly 104 and a rotor assembly 106. Stator assembly 104 includes an annular core 108 having a stator yoke or base 110 and a plurality of stator teeth 112 extending radially inward from base 110. In the exemplary embodiment, a plurality of windings 114 are wound around stator teeth 112 such that each tooth 112 includes a single winding 114. In other embodiments, stator assembly 104 includes one winding 114 for every other tooth 112. Stated differently, there are discrete windings 114 for each respective tooth 112, and in other embodiments, a single winding is of suitable length to enable the length of the single winding to be wrapped around the plurality of stator teeth.

Stator base 110 includes an inner surface 116 and an outer surface 118. Inner surface 116 and outer surface 118 extend about central axis X and are separated by a radial distance relative to the axis X. Inner surface 116 and outer surface 118 define a thickness 120 of base 110 therebetween. The thickness 120 of base 110 may vary circumferentially. In alternative embodiments, stator assembly 104 includes any base 110 that enables motor assembly 100 to operate as described herein.

Also, in the exemplary embodiment, stator assembly 104 has an outer diameter D1 defined by base 110. In some embodiments, the outer diameter D1 is in a range of about 100 mm (4 inches (in.)) to about 350 mm (14 in.). For example, in some embodiments, base 110 has an outer diameter of approximately 240 mm (9.5 in.) or approximately 310 mm (12.2 in.). In alternative embodiments, stator assembly 104 has any diameter that enables motor assembly 100 to operate as described herein. In addition, in the exemplary embodiment, stator teeth 112 extend radially inwardly from base 110. In some embodiments, stator teeth 112 are integral with base 110. In further embodiments, stator teeth 112 are coupled to base 110. In the exemplary embodiment, each stator tooth 112 includes a distal tip 122 that is positioned proximate rotor assembly 106.

In addition, in the exemplary embodiment, stator teeth 112 are spaced circumferentially about base 110 and define slots 124 therebetween. Stator teeth 112 are configured to receive conduction coils or windings 114 such that windings 114 extend around teeth 112 and through slots 124. In some embodiments, stator teeth 112 define no more than twenty-four slots. In the exemplary embodiment, stator assembly 104 includes eighteen stator teeth 112 defining eighteen slots 124. In alternative embodiments, motor assembly 100 includes any number of stator teeth 112, such as twelve, that enable motor assembly 100 to operate as described herein.

In some embodiments, stator assembly 104 is assembled from a plurality of laminations. Each of the plurality of laminations is formed in a desired shape and thickness. The laminations are coupled together to form stator assembly 104 having the desired cumulative thickness. In further embodiments, stator assembly 104 includes a first configuration, e.g., a flat or strip configuration, and a second configuration, e.g., a round configuration. Stator assembly 104 is moved or "rolled" from the first configuration to the second configuration to form a roll-up stator assembly 104 having a substantially cylindrical shape. In alternative embodiments, stator assembly 104 is assembled in any manner that enables stator assembly 104 to function as described herein.

Also, in the exemplary embodiment, outer surface 118 includes curved portions 126 and straight portions 128. Curved portions 126 extend circumferentially about base 110. Straight portions 128 extend along chords between curved portions 126. In addition, curved portions 126 and flat portions 128 extend longitudinally relative to central axis 102 from a first end to a second end of base 110. Curved portions 126 provide increased strength to base 110 to increase hoop stress capacity and resist deformation of base 110. In alternative embodiments, outer surface 118 includes any portion that enables motor assembly 100 to operate as described herein. For example, in some embodiments, outer surface 118 is curved about the entire periphery of base 110.

Figure 3:
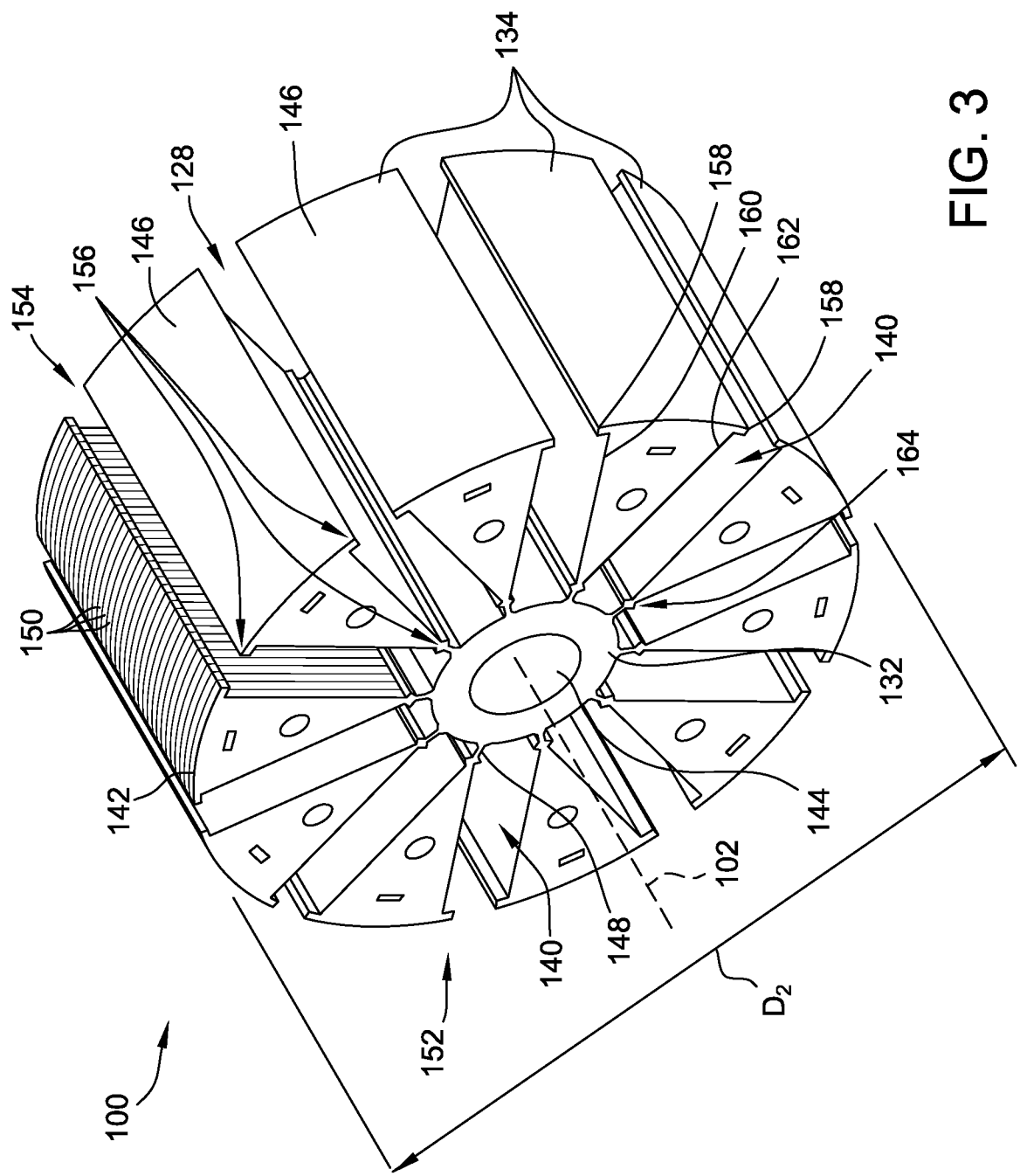
FIG. 3 is a perspective view of an exemplary rotor core that may be included within the electric motor assembly shown in FIG. 1.

With continued reference to FIGS. 2 and 3, rotor assembly 106 includes a rotor core 130 having a hub portion 132, and a plurality of rotor poles 134 circumferentially spaced about hub portion 132. Hub portion 132 includes an opening configured to receive a rotatable shaft 136 therethrough with an opposite shaft end that is coupled to a load. In the exemplary embodiment, rotor core 130 also includes a plurality of core magnets 138 alternately spaced between adjacent pairs of the plurality of rotor poles 134. The plurality of rotor poles 134 define a radial aperture 140 between each pair of circumferentially adjacent rotor poles 134, and each radial aperture 140 is configured to receive at least one core magnet 138 therein.

Accordingly, in the exemplary embodiment, rotor assembly 106 is a spoked rotor and is configured to provide increased magnetic flux in comparison to at least some known rotor assemblies. Stator assembly 104 is configured to provide capacities for the increased magnetic flux and the increased hoop stress due to the increased magnetic flux. In alternative embodiments, motor assembly 100 includes any rotor assembly 106 that enables motor assembly 100 to operate as described herein.

FIG. 3 is a perspective view of rotor core 130 illustrating the plurality of rotor poles 134 that may be included within the radial flux electric motor assembly 100 shown in FIG. 2. In the exemplary embodiment, rotor assembly 106, also referred to as a radially embedded permanent magnet rotor, includes rotor core 130 and shaft 136. Examples of motors that may include the radially embedded permanent magnet rotors include, but are not limited to, electronically commutated motors (ECM's). ECM's may include, but are not limited to, brushless direct current (BLDC) motors, brushless alternating current (BLAC) motors, and variable reluctance motors. Furthermore, rotor assembly 20 is driven by an electronic control (not shown), for example, a sinusoidal or trapezoidal electronic control.

Rotor core 130 is substantially cylindrical and includes an outer periphery 142 and a shaft central opening 144 having a diameter suitable for the diameter of shaft 136. Rotor core 130 and shaft 136 are concentric and are configured to rotate about axis of rotation (the central axis 102). In the exemplary embodiment, rotor core 130 includes the plurality of circumferentially spaced rotor poles 134 each having an outer wall 146 along rotor outer periphery 142. Further, rotor core 130 includes a rotor diameter D2 defined between midpoints of outer walls 146 of opposing rotor poles 134. As used herein, the term "substantially cylindrical" is meant to describe that the rotor core 130 includes a generally circular or oval cross-section but is not required to be perfectly circular. For example, rotor core 130 may include one or more flattened or planar portions distributed about outer periphery 142, or outer walls 146 of rotor poles 134 may include a different radius than the overall rotor core 130 or even different radii between circumferential ends of each pole 134. Although described in relation to rotor core 130, the term "substantially cylindrical" applies to each rotor core of the disclosure.

As shown in FIG. 3, in the exemplary embodiment, each rotor pole 134 is coupled to hub portion 132 by a web 148. Hub 132 defines shaft opening 144. In other embodiments, less than all of rotor poles 134 may be coupled to hub 132. Furthermore, in the exemplary embodiment, rotor core 130, and therefore each rotor pole 134, is formed by a plurality of stacked laminations 150 that are held together by interlocking, adhesive, welding, bolting, or riveting. For example, laminations 150 are fabricated from multiple punched layers of stamped metal such as steel.

Furthermore, in the exemplary embodiment, rotor core 130 includes the plurality of radial apertures 140 alternately spaced with rotor poles 134. Each radial aperture 140 is configured to receive one or more permanent magnets 138 such that each magnet 138 is radially embedded in rotor core 130 and extends at least partially from a rotor first end 152 to a rotor second end 154. In the exemplary embodiment, radial apertures 140 are generally rectangular. Alternatively, radial apertures 140 may have any suitable shape corresponding to the shape of the permanent magnets that enables the electric motor to function as described herein. In the exemplary embodiment, permanent magnets 138 are ceramic magnets magnetized in a direction tangent to axis of rotation X. However, magnet 138 may be fabricated from any suitable material that enables motor 10 to function as described herein, for example, bonded neodymium, AlNiCo, sintered neodymium, bonded and ceramic ferrite, and/or samarium cobalt.

In the exemplary embodiment, the number of radial apertures 140 is equal to the number of rotor poles 134, and one magnet 138 is positioned within each radial aperture 140 between a pair of rotor poles 134. Although illustrated as including ten rotor poles 134, rotor core 130 may have any number of poles that allows motor assembly 100 to function as described herein, for example, six, eight or twelve poles.

Also in FIG. 3, in the exemplary embodiment, each rotor pole 134 includes one or more permanent magnet retention members or protrusions 156. For example, a first pair of protrusions 156 is located proximate pole outer wall 146 along rotor outer edge 142 and extends into adjacent radial apertures 140 from circumferential end walls 160 and 162. Each protrusion 156 of the first pair of protrusions 158 is configured to facilitate retention of magnet 138 within radial aperture 140 by substantially preventing movement of magnet 138 in a radial direction towards outer edge 142. Further, a second pair of protrusions 164 is located proximate web 148 and extend adjacent radial apertures 140 from circumferential end walls 160 and 162. Each protrusion 156 of the second pair of protrusions 164 is configured to facilitate retention of magnet 138 within radial aperture 140 by substantially preventing movement of magnet 138 in a radial direction towards shaft 136. Alternatively, rotor core 130 may have any number and location of protrusions 156 that enable rotor core 130 to function as described herein.

Figure 4:
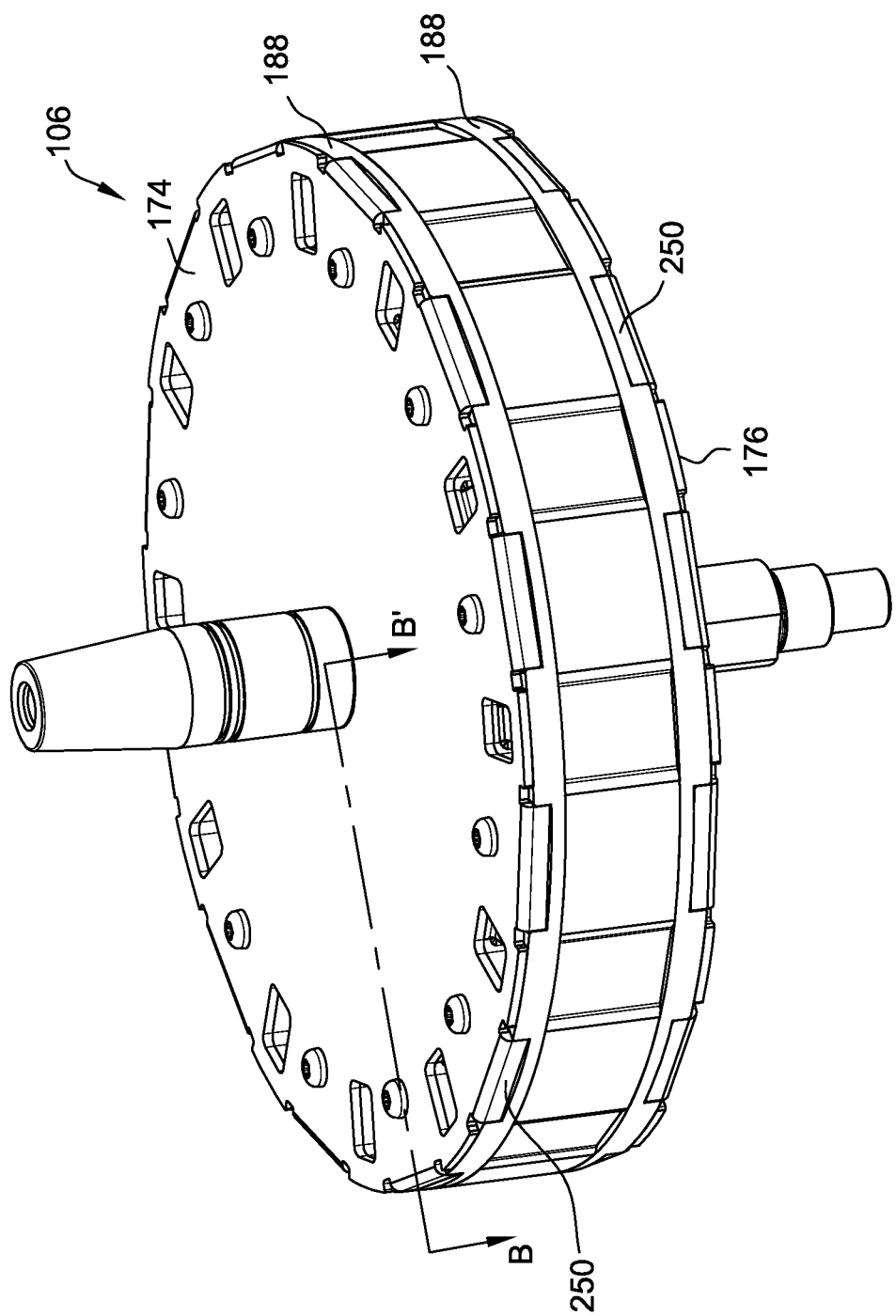
FIG. 4 is a perspective view of an exemplary rotor assembly of the electric motor assembly of FIG. 1.
Figure 5:
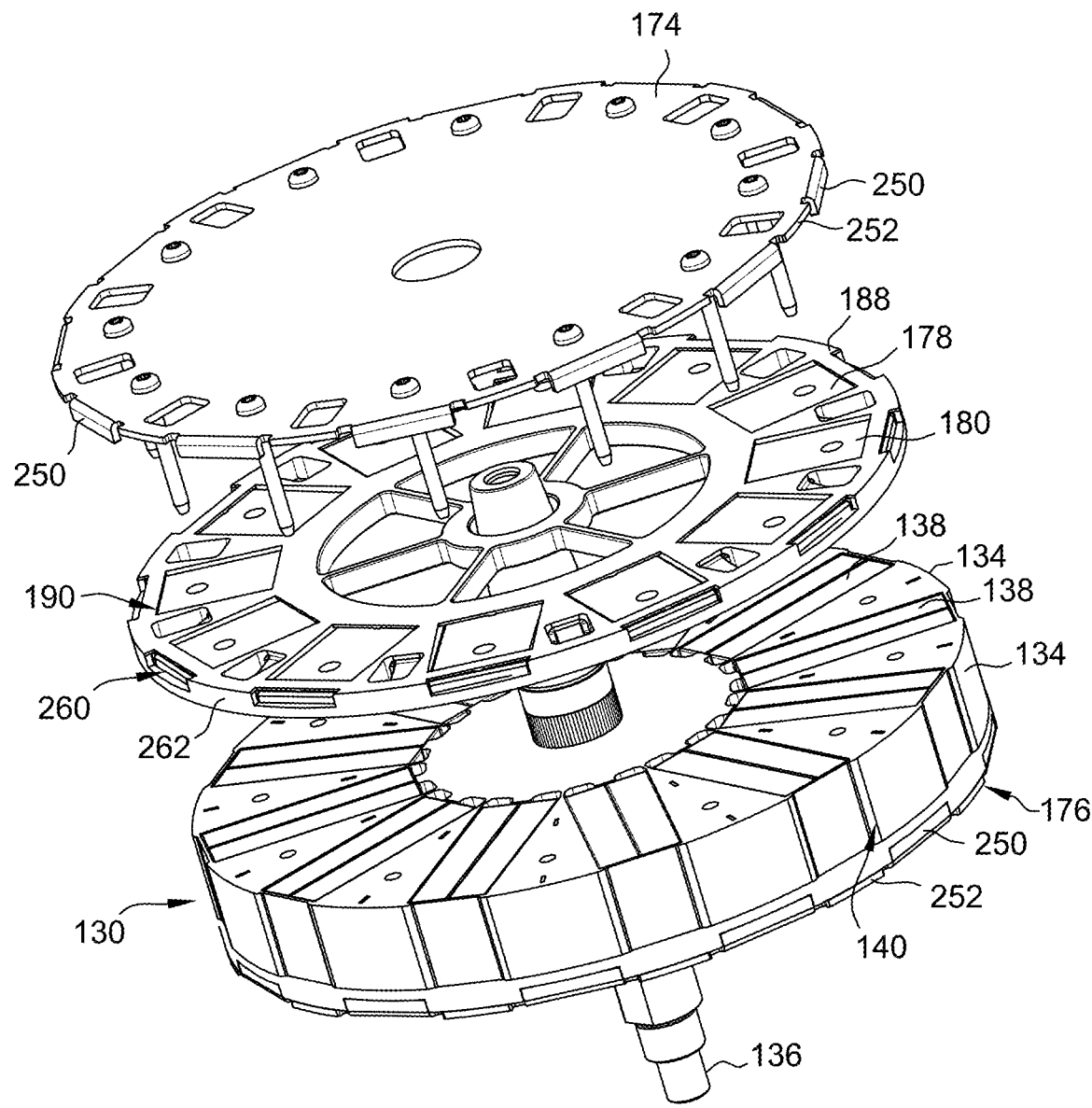
FIG. 5 is a partially exploded view of the rotor assembly of FIG. 4.

FIG. 4 illustrates a perspective view of rotor assembly 106 that includes the rotor core 130 shown in FIG. 3 and that may be included within the electric motor assembly 100 shown in FIG. 1. FIG. 5 illustrates an exploded view of the rotor assembly 106 of FIG. 4. The rotor assembly 106 includes a first end plate 174 coupled to a first plurality of end magnets 166 (see, FIG. 10) and a second end plate 176 coupled to second plurality of end magnets 166 (see FIG. 10). Eddy current losses into surrounding conductive structures can be eliminated or reduced by preventing flux leakage from the axial face of radial spoke rotors. End plates 174 and 176 provide a barrier to the flux radiating in the axial direction from rotor core 130 into the surrounding structure of motor assembly 100 and therefore eliminates eddy current losses. In the exemplary embodiment, end plates 174 and 176 are formed from a magnetic material, such as but not limited to ferritic steel and magnetic stainless steel. Alternatively, end plates 174 and 176 are formed from any material that facilitates operation of rotor assembly 106 as described herein. In some embodiments, end plates 174 and 176 may cause flux shorting, which may reduce the overall torque of motor assembly 100. In the exemplary embodiment, end magnets 166 are added to rotor assembly 106 to restore flux, resulting in substantial increases in both torque and efficiency. More specifically, first plurality of end magnets 166 is positioned between first end 152 of rotor core 130 and first end plate 174. Similarly, second plurality of end magnets 166 is positioned between second end 154 of rotor core 130 and second end plate 176.

The rotor assembly 106 further includes a pair of retainer plates 188 coupled to the end plates 174 and 176. Each retainer plate 188 includes a plurality of circumferentially spaced magnet slots 190 configured to receive the plurality of end magnets 166 therein. In such an embodiment, retainer plate 188 defines a substantially similar diameter as the end plates 174 and 176 and is made of a non-magnetic material, such as but not limited to plastic, so as not to interfere with the flow of flux between rotor core and end magnets 166.

In the exemplary embodiment, a first plurality of end magnets 166 of the first end plate 174 comprises a first subset 178 having a first polarity and a second subset 180 having a second polarity different from the first polarity. Similarly, second plurality of end magnets 166 of the second end plate 176 comprises a first subset 182 having a first polarity and a second subset 184 having a second polarity different from the first polarity. As shown in FIG. 5, first subset 178 is alternately spaced with second subset 180 of end magnets 166. Stated differently the plurality of end magnets 166 alternate polarity between adjacent end magnets. In some embodiments, end magnets 166 of first subset 182 and second subset 184 abut against one another without a discrete fastener or other structural member.

Each end magnet 166 at least partially covers an interface 186 between a rotor pole 134 and an adjacent core magnet 138. More specifically, each end magnet 166 will at least partially overlap with a corresponding rotor pole 134 and core magnet 138 such that end magnets 166 provide a path for flux to flow between rotor pole 134 and core magnet 138. Alternatively, in cases where end magnets 166 may not cover interface 186, a circumferential edge of end magnets 166 is flush with a circumferential edge of the corresponding rotor pole 134. However, as explained in further detail below, the position of each end magnet 166 relative to the corresponding rotor pole 134 and core magnet 138 can be adjusted such that the path for flux to flow between rotor pole 134 and core magnet 138 varies. By adjusting the position of each end magnet 166 relative to the core magnet 138, the torque constant of the electric motor assembly 100 can be changed such that the motor assembly 100 can operate at high state, or a low torque, high speed state, or in a state in-between. Stated differently, adjusting the position of each end magnet 166 relative to the core magnet 138 can optimize the function and efficiency of the motor assembly 100 by changing the torque constant of the motor. In some embodiments, each end magnet 166 abuts the interface 186. In some embodiments, each end magnet 166 is positioned a distance from the interface 186.

Figure 6:
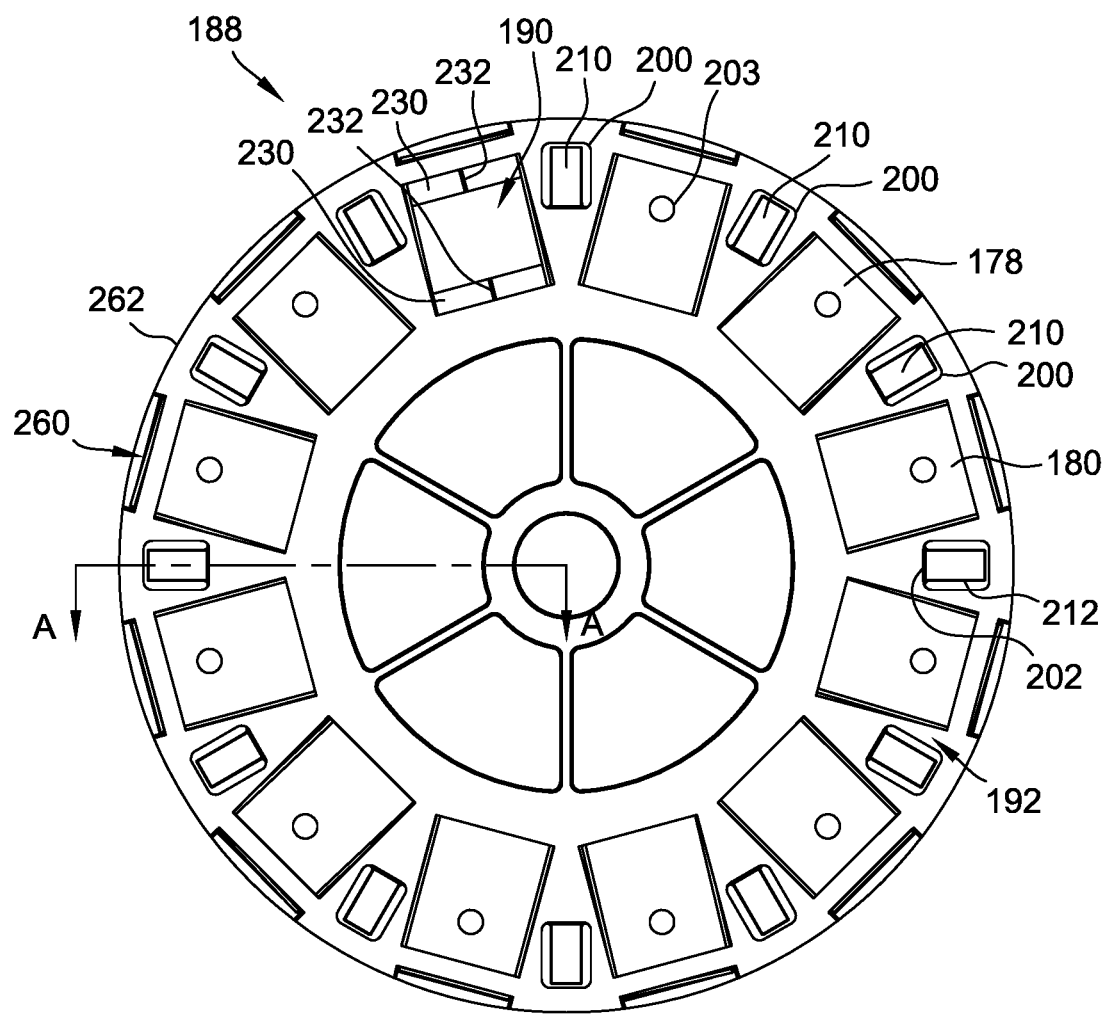
FIG. 6 is perspective view of a retainer plate of the rotor assembly of FIG. 4.
Figure 7:
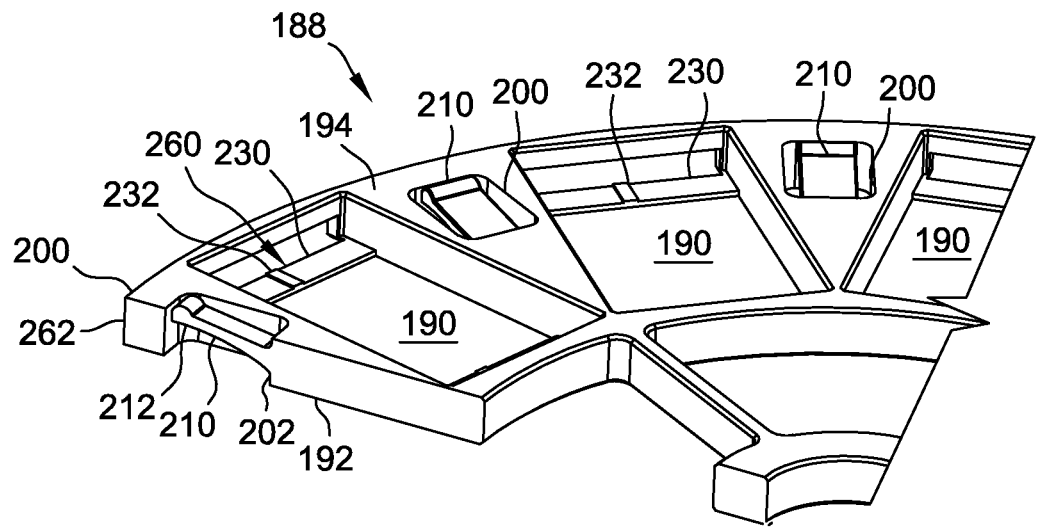
FIG. 7 is cross-sectional perspective view of the retainer plate of FIG. 6 taken along line A-A.
Figure 8:
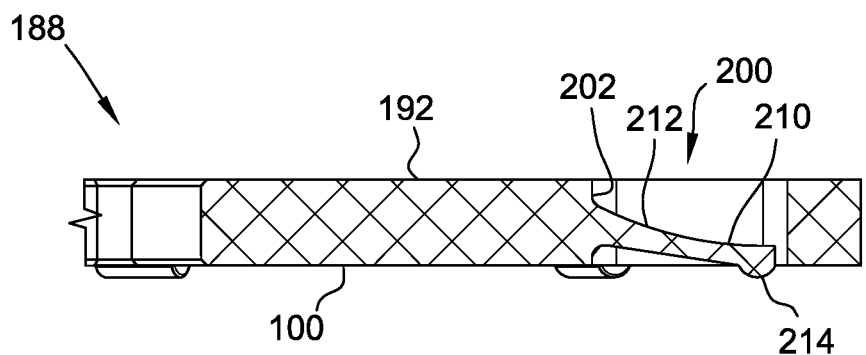
FIG. 8 is cross-sectional view of the retainer plate of FIG. 6 taken along line A-A.

FIG. 6 is perspective view of the retainer plate 188 of the rotor assembly 106 of FIG. 4. FIG. 7 is cross-sectional perspective view of the retainer plate 188 of taken along line A-A (as shown in FIG. 6). FIG. 8 is cross-sectional view of the retainer plate taken along line A-A (as shown in FIG. 6).

Figure 11:
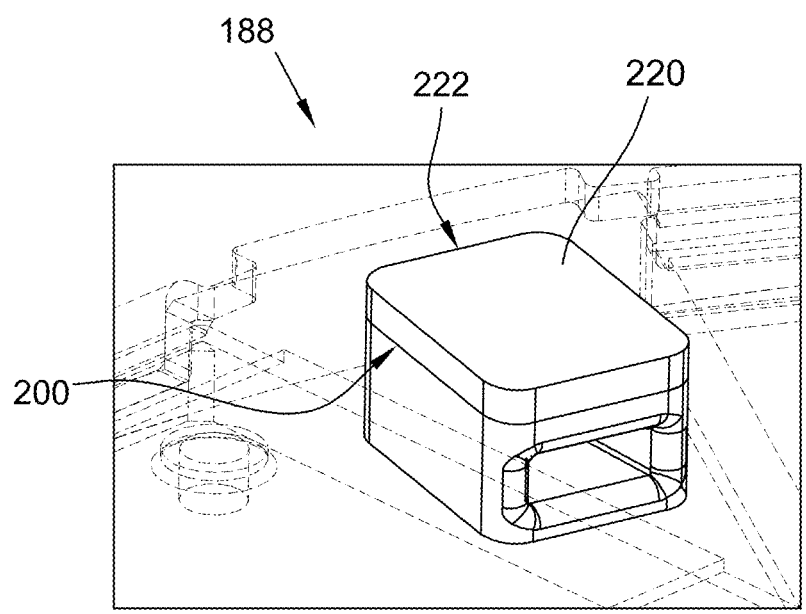

As shown in FIGS. 7 and 8, the first subset 178 and a second subset 180 of the plurality of end magnets 166 are positioned within the plurality of circumferentially spaced magnet slots 190 of the retainer plate 188. The retainer plates 188 further include a plurality of balancing slots 200 located between adjacent magnet slots 190. Both the magnet slots 190 and the balancing slots 200 extend through the thickness of the retainer plate 188 defined by a first surface 192 and a second surface 194 of the retainer plate 188. As explained in further detail below, the balancing slots 200 are configured to receive one or more of a balancing weight 220 (as shown in FIG. 11) and a compression spring 210. Each of the balancing slots 200 include an inside surface 202 defined by the opening of the balancing slot 200. Stated differently, the inside surface 202 is a substantially perpendicular sidewall formed by the opening of the balancing slot 200. Where the balancing slots 200 are substantially rectangular openings, the inside surface 202 can be any of the sidewalls of the balancing slot 200.

Figure 9:
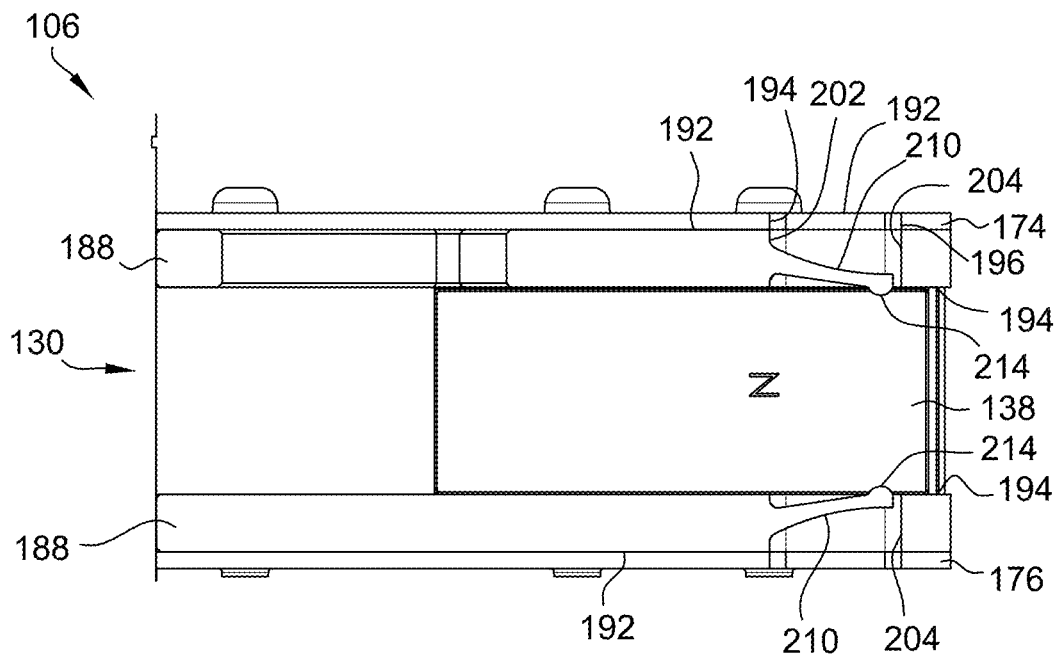
FIG. 9 is a cross-sectional view of the rotor assembly of FIG. 4 taken along line B-B.

As shown in FIGS. 6 through 9, the compression springs 210 comprise a cantilevered arm 212 extending from a first inside surface 202 of the balancing slots 200. As best shown in FIGS. 7 and 9, the compression springs 210 include a distal end 214 opposite the first inside surface 202 of the balancing slots 200 which extends beyond the second surface 194 of the retainer plate 188. As shown in FIG. 9, when the retainer plates 188 are assembled and adjacent to the end plates 176, the second surface 194 of the retainer plate 188 is adjacent to the core magnets 138 and the distal ends 214 of the compression springs 210 contact the core magnets 138 such that the cantilevered arms 212 elastically deform, applying a biasing force against the core magnets 138. The biasing force applied by the cantilevered arms 212 reduce relative movement of the core magnets 138, reducing play and audible noise generation of the core magnets 138 within the radial apertures 140 of the rotor core 130 (as shown in FIG. 5).

In some embodiments, the compression springs comprise a leaf spring (not shown) extending from the first inside surface 202 to a second inside surface 204 (as shown in FIG. 9). The leaf spring operates in a substantially similar manner as the cantilevered arm 212 in that the leaf spring includes a medial portion which extends beyond the second surface 194 of the retainer plate 188. When the retainer plates 188 are assembled and adjacent to the end plates 176, the second surface 194 of the retainer plate 188 is adjacent to the core magnets 138 and the medial portion of the leaf spring contacts the core magnets 138 such that the leaf springs elastically deform, applying a biasing force against the core magnets 138.

In some embodiments, as best shown in FIG. 9, the end plates (174, 176) include circumferentially spaced slots 192 radially aligned with the circumferentially spaced balancing slots 200 of the retainer plates 188. In some embodiments, the circumferentially spaced slots 192 of the end plates (174, 176) include compression springs that operate in a substantially same matter as the compression springs 210 of the retainer plates 183. In some embodiments, the compression springs of the end plates (174, 176) comprise a cantilevered arm (not shown) extending from a first inside surface 194 of the end plates (174, 176), the first inside surface 194 defined by the circumferentially spaced slots 192 of the end plates (174, 176). In some embodiments, the compression springs of the end plates (174, 176) comprise a leaf spring or extending from the first inside surface 192 to a second inside surface 194 of the end plate. The compression springs of the end plates (174, 176) extend beyond the second surface 194 of the retainer plate 188 when the retainer plate 188 is positioned against the end plates (174, 176) and apply a biasing force against the core magnets 138. The biasing force applied by the compression springs of the end plates (174, 176) reduce relative movement of the core magnets 138, reducing play and audible noise generation of the core magnets 138 within the radial apertures 140 of the rotor core 130 (as shown in FIG. 5).

As shown in FIG. 11, in some embodiments, at least one balancing weight 220 can be positioned within one or more of the balancing slots 200 of the retainer plates 188, and/or within one or more of the circumferentially spaced slots 192 of the end plates (174, 176). With the inclusion of at least one balancing weight 220 positioned within the balancing slots 200 of the retainer plates 188, the rotor assembly 106 can be rotationally balanced such, improving the efficiency of the motor 100 and reducing audible noise generated at low speeds.

The balancing weight 220 can be selected from the group consisting of a putty or a weighted element. FIG. 11 illustrates a maximum physical envelope 222 into which the balancing weight 220 can fit within. Depending on the required mass to balance the rotor assembly 106 and the density of the balancing weight 220, in some embodiments the balancing weight 220 occupies the entire envelope 222 (as shown in FIG. 11), or only a portion of the envelope 222. In a preferred embodiment, the putty can be formed and pressed into the balancing slot 200 and, due to adhesive properties of the putty, the putty will remain within the balancing slot 200 without additional mechanical securement of the putty to the retainer plates 188.

Figure 10:
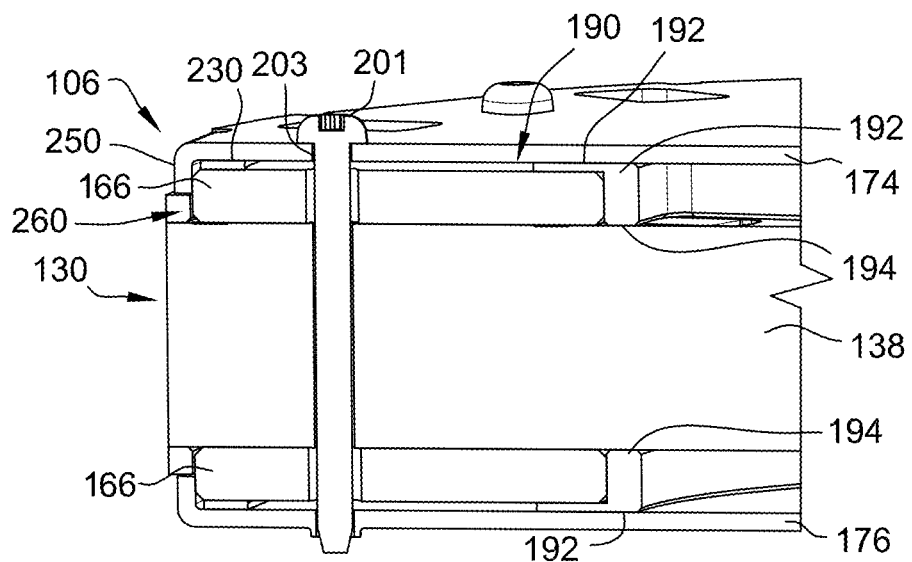
FIG. 10 is a cross-sectional view of the rotor assembly of FIG. 4 taken along line B-B; and, FIG. 11 is an enlarged perspective view of a balancing weight in accordance with one or more embodiments of the present disclosure.

As shown in FIGS. 6, 7, and 10, in some embodiments, the first surface 192 of the retainer plates 188 further include at least one bridge 230 extending circumferentially across the circumferentially spaced magnet slots 190. The bridges 230 are configured to reduce stress on the plurality of end magnets 166 as the plurality of end magnets 166 are fastened to the end plates (174, 176). As best shown in FIG. 10, a fastener 201 is inserted into an aperture 203 of each of the plurality of end magnets 166. As the fastener 201 is torqued, the forces applied to the plurality of end magnets 166 are distributed between the least one bridge 230. In some embodiments, the least one bridge 230 include a tab 232 which aligns with the lamination interlock and prevents radial cracking of the end magnets 166.

As shown in FIG. 5, each of the end plates (174, 176) includes a plurality of medial tabs 250 spaced circumferentially along the outer peripheral edge 252 of the respective end plate (174, 176). Each of the medial tabs extends from the outer peripheral edge 252 of the end plates (174, 176). Each medial tab is oriented substantially perpendicular to the respective end plate (174, 176). When the rotor is assembled for use, the medial tabs 250 are seated in corresponding slotted openings 260 provided in the adjacent retainer plate 188. The slotted openings are spaced circumferentially along peripheral edge 262 of retainer plates 188. Each of the slotted openings 260 is located between a pair of adjacent balancing slots 200 of the end plates (174, 176) and each slotted opening 260 is radially aligned with a spaced magnet slot 190 and is in communication with the magnet slot. When located in the slots 260, the seated medial tabs 250 are configured to radially contain the end magnets (178, 180) against centrifugal forces at high rotor speeds.

As shown in FIGS. 5, through 7, each of the plurality of circumferentially spaced slotted openings 260 extends through the outer peripheral edge 262 of the retainer plate 188. The spaced magnet slot 190 is configured to receive a magnet of either one of the first subset 178 and the second subset 180 of the plurality of end magnets 166 such that any of the magnets can be easily inserted into the plurality of circumferentially spaced magnet slots 190.

As shown in FIGS. 4 and 10, the medial tabs 250 of the end plates (174, 176) close the opening 260 of each of the circumferentially spaced magnet slots 190 upon assembling the end plates (174, 176) and locating the plates adjacent the retainer plate 188. Shown most clearly in FIG. 10, when located in the slotted opening 260, the end of the medial tab 250 contacts the retainer plate 188 to contact the end magnets (178, 180) and are configured to radially contain the end magnets (178, 180). Thus, to assemble the rotor assembly 106, the retainer plate 188 is first positioned inside the end plates (174, 176) to create circumferentially spaced magnet slots 190. End magnets (178, 180) are then loaded axially into the circumferentially spaced magnet slots 190. The end plates (174, 176) are then fixed to the rotor core 130 (of FIGS. 2 and 3). The medial tabs 250 are aligned with the opening 260.

Exemplary embodiments of rotor cores for electric machines are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for use in a radial flux electric motor assembly, the rotor assembly comprising:
    a rotatable rotor shaft defining a central axis, the rotor shaft coupled to a rotor core, the rotor core including a plurality of rotor pole pieces circumferentially located about the central axis, each pair of adjacent pole pieces being separated by a space, said rotor core comprising a plurality of core magnets located in the spaces separating the adjacent pole pieces;
    at least one magnet retainer plate positioned adjacent the rotor core and connected to the rotatable rotor shaft, the at least one magnet retainer plate including a plurality of circumferentially spaced magnet slots and balancing slots located between adjacent magnet slots, the balancing slots configured to receive a balancing weight; and,
    compression springs located in the balancing slots, each compression spring located adjacent a respective core magnet when the at least one magnet retainer plate is located adjacent the rotor core.

2. The rotor assembly of claim 1, wherein the compression springs comprise a cantilevered arm extending from a first inside surface of the at least one magnet retainer plate, the first inside surface defined by the balancing slot.

3. The rotor assembly of claim 2 further comprising at least one balancing weight positioned within one or more of the balancing slots.

4. The rotor assembly of claim 1, wherein the compression springs comprise a leaf spring extending from a first inside surface to a second inside surface of the at least one magnet retainer plate, the first inside surface and second inside defined by the balancing slot.

5. The rotor assembly of claim 1 further comprising an end plate adjacent to the at least one magnet retainer plate, the end plate including circumferentially spaced slots radially aligned with the circumferentially spaced balancing slots of the at least one magnet retainer plate.

6. The rotor assembly of claim 5, wherein the circumferentially spaced slots of the end plate include the compression springs.

7. The rotor assembly of claim 6, wherein the compression springs comprise a cantilevered arm extending from a first inside surface of the end plate, the first inside surface defined by the circumferentially spaced slots of the end plate.

8. The rotor assembly of claim 6, wherein the compression springs comprise a leaf spring extending from a first inside surface to a second inside surface of the end plate, the first inside surface and second inside defined by the circumferentially spaced slots of the end plate.

9. The rotor assembly of claim 5, wherein the end plate includes a number of medial tabs extending from an outer peripheral edge of the end plate, the medial tabs positioned between the circumferentially spaced slots.

10. The rotor assembly of claim 9, wherein the end plate includes a plurality of medial tabs each extending substantially perpendicular to the end plate.

11. The rotor assembly of claim 9, wherein the retainer plate includes a plurality of slotted openings along the peripheral edge of the retainer plate, each slotted opening aligned with one of the plurality of circumferentially spaced magnet slots.

12. The rotor assembly of claim 11, wherein each of the medial tabs is located in a respective slotted opening when the end plate is moved into abutment with the retainer plate.

13. The rotor assembly of claim 1, wherein each compression spring is configured to apply a force against an associated core magnet of the rotor core.

14. The rotor assembly of claim 1 further comprising at least one balancing weight positioned within one or more of the balancing slots.

15. The rotor assembly of claim 14, wherein the at least one balancing weight is selected from the group consisting of a weighted element and putty.

16. The rotor assembly of claim 15, wherein the weighted element is sized and configured to fit within the balancing slot.

17. The rotor assembly of claim 1, wherein an outside surface of at least one of the plurality of end magnets include a notch disposed within the outside surface, the detent configured to interdigitate with a tab of at least one bridge extending across each of the circumferentially spaced magnet slots.

18. The rotor assembly of claim 1, wherein the at least one magnet retainer plate further comprises a plurality of rectangular end magnets each positioned in one of the plurality of circumferentially space magnet slots.

19. A rotor assembly for use in a radial flux electric motor assembly, said rotor assembly comprising:
a rotatable rotor shaft defining a central axis, the rotor shaft coupled to a rotor core, the rotor core including a plurality of rotor poles circumferentially located about the central axis, each pair of adjacent pole pieces being separated by a space, said rotor core comprising a plurality of core magnets located in the space separating the adjacent pole pieces;
at least one magnet retainer plate positioned adjacent the rotor core and connected to the rotatable rotor shaft, the at least one magnet retainer plate including circumferentially spaced magnet slots and balancing slots located between adjacent magnet slots, the balancing slots configured to receive a balancing weight; and,
at least one balancing weight positioned within the balancing slots.

20. The rotor assembly of claim 19, wherein the at least one balancing weight is selected from the group consisting of a weighted element and putty.

21. The rotor assembly of claim 19, further comprising compression springs located in the balancing slots each compression spring located adjacent a respective core magnet when the retainer plate is located adjacent the rotor core, wherein the compression spring is configured to apply a force against the plurality of core magnets of the rotor core.

22. The rotor assembly of claim 21, wherein the compression springs comprise a cantilevered arm extending from a first inside surface of the at least one magnet retainer plate, the first inside surface defined by the balancing slot.

23. The rotor assembly of claim 19 further comprising an end plate connected to the at least one magnet retainer plate, the end plate including circumferentially spaced slots aligned with the circumferentially spaced balancing slots of the at least one magnet retainer plate.

24. A rotor assembly for use in a radial flux electric motor assembly, said rotor assembly comprising:
a rotatable rotor shaft defining a central axis, the rotor shaft coupled to a rotor core, the rotor core including a plurality of rotor poles circumferentially located about the central axis, each pair of adjacent pole pieces being separated by a space, said rotor core comprising a plurality of core magnets located in the space separating the adjacent pole pieces;
at least one magnet retainer plate positioned adjacent the rotor core and connected to the rotatable rotor shaft, the at least one magnet retainer plate including circumferentially spaced magnet slots and balancing slots located between adjacent magnet slots, the balancing slots configured to receive a balancing weight;
compression springs located in the balancing slots; each compression spring located adjacent a respective core magnet when the retainer plate is located adjacent the rotor core; and
at least one balancing weight positioned within the balancing slots.

25. The rotor assembly of claim 24, a first surface of the retainer plate includes at least one bridge extending circumferentially across the circumferentially spaced magnet slots, the at least one bridge configured to reduce stress on the plurality of end magnets.

* * * * *